US011109540B2

(12) United States Patent
Aminpour et al.

(10) Patent No.: US 11,109,540 B2
(45) Date of Patent: Sep. 7, 2021

(54) MIXED MEDIA VERTICAL FARMING

(71) Applicants: Rouzbeh Aminpour, Bellevue, WA (US); Maryam Aminpour, Bellevue, WA (US)

(72) Inventors: Rouzbeh Aminpour, Bellevue, WA (US); Maryam Aminpour, Bellevue, WA (US)

( * ) Notice: Subject to any disclaimer, the term of this patent is extended or adjusted under 35 U.S.C. 154(b) by 214 days.

(21) Appl. No.: 16/202,040

(22) Filed: Nov. 27, 2018

(65) Prior Publication Data
US 2020/0163283 A1    May 28, 2020

(51) Int. Cl.
| | |
|---|---|
| *A01G 9/02* | (2018.01) |
| *A01G 9/029* | (2018.01) |
| *A01G 9/24* | (2006.01) |
| *A01G 9/00* | (2018.01) |
| *A01G 27/00* | (2006.01) |
| *A01G 9/26* | (2006.01) |

(52) U.S. Cl.
CPC ............ *A01G 9/023* (2013.01); *A01G 9/006* (2013.01); *A01G 9/029* (2018.02); *A01G 9/246* (2013.01); *A01G 9/247* (2013.01); *A01G 9/26* (2013.01); *A01G 27/003* (2013.01); *A01G 27/008* (2013.01)

(58) Field of Classification Search
CPC ........ A01G 9/023; A01G 9/025; A01G 9/029; A01G 9/006; A01G 9/246; A01G 9/247; A01G 9/24; A01G 9/26; A01G 27/003; A01G 27/008
See application file for complete search history.

(56) References Cited

U.S. PATENT DOCUMENTS

| | | | | |
|---|---|---|---|---|
| 4,295,296 A | * | 10/1981 | Kinghorn ............... | A01G 9/025 47/82 |
| 5,315,834 A | * | 5/1994 | Garunts ................. | B01D 53/85 62/78 |

(Continued)

FOREIGN PATENT DOCUMENTS

WO    WO-2019155469 A1 *  8/2019   ............. A01G 31/06

OTHER PUBLICATIONS

CBS This Morning, "How Aerofarms' vertical farms grow produce", YouTube.com, Mar. 27, 2017, 4 pages [online]. Retrieved from the Internet: <URL:https://youtu.be/ME_rprRImMM>.

(Continued)

*Primary Examiner* — Monica L Barlow
*Assistant Examiner* — Aaron M Rodziwicz
(74) *Attorney, Agent, or Firm* — Klein, O'Neill & Singh, LLP

(57) ABSTRACT

A mixed media farm may include a tray for holding water at a prescribed water level. A cell may be placable on the tray, with the cell defining a cavity and having at least one opening in communication with the cavity. The cell may be sized such that when the cell is placed on the tray, a lower portion of the cell resides below the prescribed water level and an upper portion of the cell resides above the prescribed water level. Soil may be in the cavity, with the soil having a lower portion below the prescribed water level, and an upper portion above the prescribed water level when the cell is placed in the tray. A plurality of seeds may be planted in the upper portion of the soil, with the plurality of seeds defining a seed density of greater than 5 seeds per square inch.

20 Claims, 10 Drawing Sheets

(56) References Cited

U.S. PATENT DOCUMENTS

| | | | | |
|---|---|---|---|---|
| 5,826,375 | A * | 10/1998 | Black | A01G 9/023 47/67 |
| 6,105,309 | A * | 8/2000 | Takayanagi | A01G 31/02 47/62 R |
| 8,549,788 | B2 * | 10/2013 | Bryan, III | A01G 31/02 47/620 |
| 10,477,786 | B1 * | 11/2019 | Wilson | A01G 31/047 |
| 10,524,433 | B2 * | 1/2020 | Spiro | A01G 9/26 |
| 2003/0101645 | A1 * | 6/2003 | Cole | A01G 31/02 47/61 |
| 2012/0144740 | A1 * | 6/2012 | Igarashi | A01G 31/06 47/62 R |
| 2013/0074408 | A1 * | 3/2013 | Singh | A01G 31/02 47/62 E |
| 2014/0020292 | A1 * | 1/2014 | McNamara | A01G 9/26 47/66.6 |
| 2014/0223815 | A1 * | 8/2014 | Kuo | A01G 9/025 47/82 |
| 2014/0318012 | A1 * | 10/2014 | Fujiyama | A01G 31/02 47/62 R |
| 2015/0223418 | A1 * | 8/2015 | Collins | A01G 9/16 47/62 R |
| 2015/0351328 | A1 * | 12/2015 | Leigh | A01G 9/025 47/83 |
| 2016/0037737 | A1 * | 2/2016 | Fingerle | C05F 11/00 47/62 R |
| 2016/0135395 | A1 * | 5/2016 | Umpstead | A01G 31/02 47/62 A |
| 2016/0192606 | A1 * | 7/2016 | Karbowski | A01G 31/02 47/62 A |
| 2016/0316645 | A1 * | 11/2016 | Neufeld | A01G 31/02 |
| 2016/0345518 | A1 * | 12/2016 | Collier | A01G 9/023 |
| 2016/0360712 | A1 * | 12/2016 | Yorio | A01G 9/249 |
| 2017/0079223 | A1 * | 3/2017 | Cheng | A01G 9/20 |
| 2018/0035627 | A1 * | 2/2018 | Williams | A01G 31/06 |
| 2018/0317411 | A1 * | 11/2018 | Spiro | A01G 9/0293 |
| 2018/0325040 | A1 * | 11/2018 | Burnett, II | A01G 9/029 |
| 2019/0110407 | A1 * | 4/2019 | Su | A01G 27/00 |
| 2019/0183062 | A1 * | 6/2019 | Pham | A01G 31/06 |
| 2019/0335692 | A1 * | 11/2019 | Speetjens | F03B 13/00 |
| 2020/0128760 | A1 * | 4/2020 | Avery | A01G 9/023 |
| 2020/0214226 | A1 * | 7/2020 | Yukawa | A01G 9/249 |
| 2020/0229357 | A1 * | 7/2020 | Spiro | A01G 9/029 |

OTHER PUBLICATIONS

Freight Farms, "Introduction To The Leafy Green Machine", YouTube.com, Feb. 8, 2017, 2 pages [online]. Retrieved from the Internet: <URL:https://youtu.be/I0UX6uo-4_8>.

Transcript of "How Aerofarms' vertical farms grow produce", 3 pages.

Transcript of "Introduction To The Leafy Green Machine", 6 pages.

* cited by examiner

MIXED MEDIA VERTICAL FARMING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to farming, and more specifically to a scalable mixed media farm using soil and water to provide nutrients to seeds planted in or on the soil in a high plant density.

2. Description of the Related Art

Existing farming practices may be limited by several variables, which may reduce the efficiency and output of the farm. Accordingly, there is a need in the art for an improved farm and related farming methodology. Various aspects of the present disclosure address this particular need, as will be discussed in more detail below.

BRIEF SUMMARY

The present disclosure describes a mixed media farm and related methodology. The mixed media farm may be implemented as a scalable, vertical and/or horizontal farm that allows the operator to scale up (e.g., full scale production of entire farm space) or scale down (e.g., one unit) the production of the farmed crop to match demand of the farmed crop. For example, the mixed media farm may scale in a shorter interval such as days or weeks. The farmed crop may be grown in a mixed media, which may include an aerated soil that may be 100% saturated with water, preferably only at a lower portion of the aerated soil. The mixed media farm may include several trays, with each tray being capable of holding water for growing plants in the tray. Other media is also contemplated including but not limited to growth elements, nutrition, fertilizers, feed pellets, etc. The plants may be planted in cells, which hold soil for providing nutrients to the plants. A lower portion of the soil may be submerged within the water located in the tray to saturate the lower portion of the soil, while allowing water to wick up to the upper portion of the soil for nourishing the plants. Seeds may be planted in the cells at a high density, such that as the seeds germinate and grow, the leaf coverage of the plants may extend over substantially all of the soil to substantially block light and mitigate light from penetrating beneath the top surface of the soil. The high density of plants may also allow the mixed media farm to efficiently use the space occupied by the mixed media farm. Furthermore, the mixed media farm may provide maximum growth media without the need for constant watering or chemicals, fertilizers and/or insecticides.

A mixed media farming method may comprise the steps of planting a plurality of seeds in soil located in a cell, with the plurality of seeds being arranged within the cell such that the plurality of seeds define a seed density of at least 5 seeds per square inch for a large leafy plant such as sweet basil, Thai basil or mints and 1,000 seeds per square inch for a small leafy plant such as thyme. The method may further include partially submerging the cell in water retained within a tray such that a lower portion of the cell is submerged under the water and an upper portion of the cell extends above the water, the cell having at least one opening submerged in the water to allow a lower portion of the soil to become saturated by the water. The method may additionally comprise directing light emitted from an electronic light source toward the soil, and allowing the plurality of seeds to sprout and grow leaves which substantially cover the soil to substantially block light emitted from the electronic light from penetrating through the soil for mitigating algae growth, fungal or other root/soil relate.

The method may include aerating the soil to mitigate anaerobic bacteria growth and facilitate growth of aerobic bacteria. It is also contemplated that in addition to aerating the soil, the water in the trays may be aerated by bubbling air through the water either before it is fed into the tray or while it is in the tray.

The step of partially submerging the cell in water may include at least partially filling the tray with water, and then placing the cell in the tray. The step of partially submerging the cell in water may include placing the cell in the tray and then at least partially filling the tray with water.

The planting step may include planting the seeds in the soil such that the seed density is at least 10 seeds per square inch. It is also contemplated that the seed count may be 1 seed per square inch such as for strawberry seeds. This ratio or density may pertain to large seeds that can be separated or counted by hand such as seeds for basil. The planting step may include planting the seeds in the soil or laying/spreading the seed on the top surface of the soil such that the seed density is at least 15 seeds per square inch or even at least 20 seeds per square inch. The density of seeds per square inch may be 1 to 50 seeds per square inch for leafy plants. The number of seeds per square inch may be between 1-300 but is preferably between 1 and 30 for leafy fruits and plants such as strawberry and basil. However, for plants that have very small seeds such as seeds for needle like plants (i.e., chives), these seeds may be smeared or spread onto the top of the soil. For these small seeds, the seeds may be spread out to cover about 20% to 80% of the top surface area of the soil, and more preferably about 40% to 60% of the top surface area of the soil. No counting of the seeds is necessary.

The method may include placing the tray in a room, and controlling a humidity of air inside of the room. The controlling step may include maintaining the humidity of air inside of the room below 60 percent humidity. The controlling step may include maintaining the humidity of air inside of the room below 50 percent humidity.

The method may include placing the tray in a room and controlling the temperature of air inside the room. The controlling step may include maintaining the temperature of the room between 60-80 degrees Fahrenheit. Preferably, the controlling step may include maintaining the temperature of the room between 70-75 degrees Fahrenheit.

A farm may be provided, with the farm comprising a tray for holding water at a prescribed water level. The farm may additionally include a cell defining a cavity and having at least one opening in communication with the cavity. The cell may be placable on the tray, with the cell being sized such that when the cell is placed on the tray a lower portion of the cell resides below the prescribed water level and an upper portion of the cell resides above the prescribed water level. Soil may be in the cavity, with the soil having a lower portion below the prescribed water level, and an upper portion above the prescribed water level when the cell is placed in the tray. A plurality of seeds may be planted in the upper portion of the soil or on the top surface of the soil, with the plurality of seeds defining a seed density of greater than 5 seeds per square inch.

The farm may include an electronic light device configured to emit light toward the soil.

The farm may include a water reservoir and a supply line in communication with the water reservoir and the tray for communicating water from the water reservoir to the tray.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
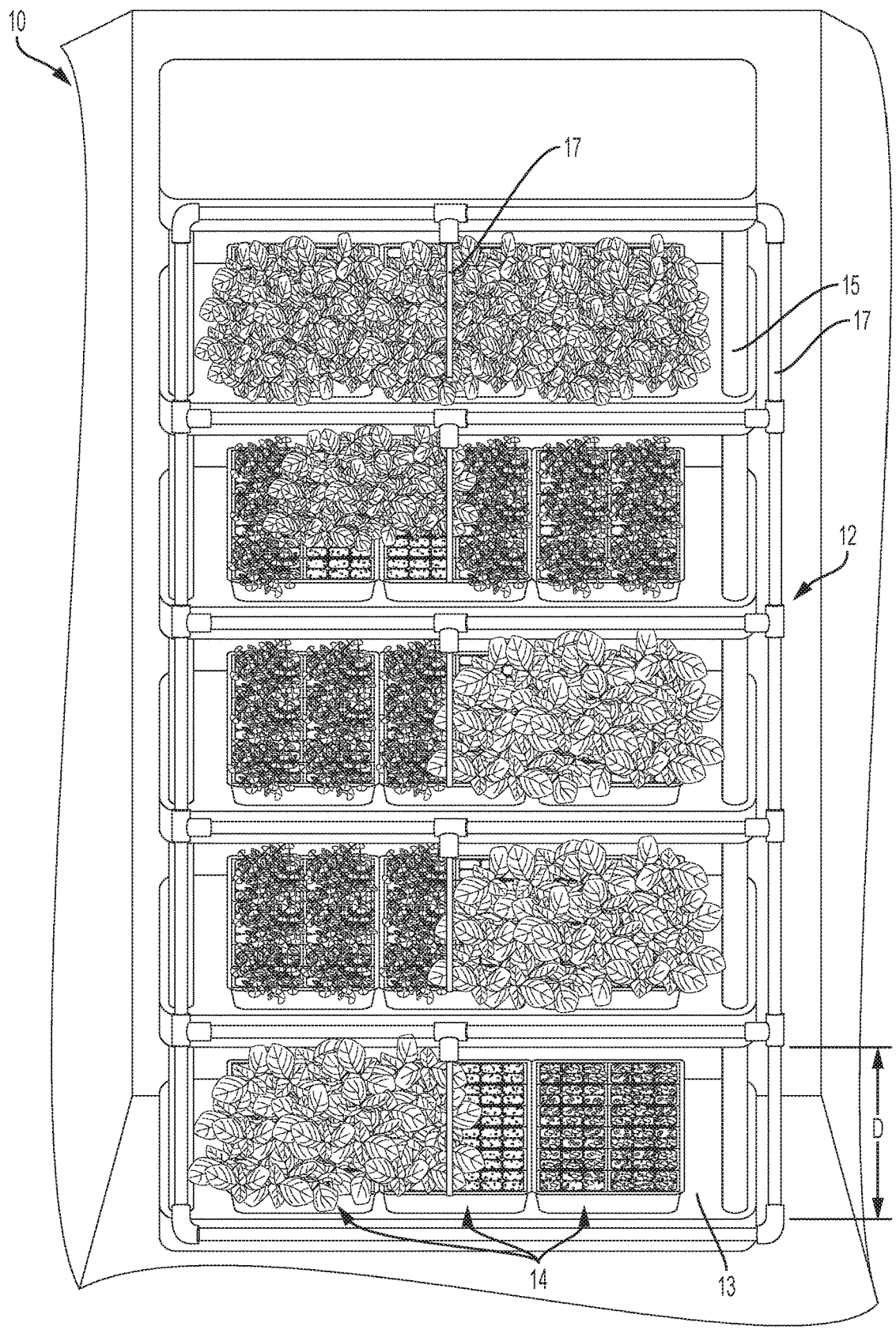
FIG. 1 is a perspective view of a mixed media farm.

Referring now to the drawings, wherein the showings are for purposes of illustrating preferred aspects of the present disclosure, and are not for purposes of limiting the same, there is depicted a multi-level, mixed media farm 10 for growing plants. The term mixed media may refer to aerated soil that may be 100% saturated with water only at a lower portion of the aerated soil. The mixed media farm 10 may include seeds planted in soil or on the top surface of the soil, with the soil being located within a small container having a permeable wall to allow water to flow through the small container to saturate the soil. The seeds may be planted in the soil in a high density, such as 10-20 seeds in 1 square inch for leafy plants and some fruits (e.g., strawberry) or even higher for plants that have very small seeds. The small container (e.g., plastic, glass, or fabricated capable of being submersed in water for a grow period without degradation) for may be placed within a tray, which holds a sufficient amount of water to keep the bottom of the soil 100% saturated, while a top portion of the soil may not be saturated or submerged in water. The result is that at least a portion of the soil may have a consistency similar to wet mud. The water from the bottom may be wicked upwardly through the soil toward the seeds. Since the upper portion of the soil may not be 100% saturated with water, aerobic bacteria (e.g., good bacteria) may grow in the upper portion of the soil. The growth of aerobic bacteria may mitigate the formation of undesirable fungus in the soil. Low wattage spread-spectrum LED light (e.g., white light) may provide the light needed to grow the plants. As the seeds sprout and grow stems and leaves, the high plant density may allow the plants to cover the soil and block light emitted by the LED from penetrating through the soil, which may prevent algae from growing on the soil. As such, the mixed media farm 10 may allow a farm operator to control algae growth, fungal growth, and anaerobic bacteria growth, any one of which if grown excessively may destroy the farmed crop. Furthermore, the high density growing of the plants may allow plants to be grown more efficiently than those plants grown using existing farming techniques.

The mixed media farm 10 may deliver maximum growth media, while minimizing or eliminating the need for constant water, or adding chemicals. Although sprinklers and manual watering may be done, it is not necessary. Furthermore, the construction of the mixed media farm 10 may allow an operator to scale up or scale down the production of a farmed crop based on demand of the crop. For example, the mixed media farm 10 may be scaled both horizontally up to cover the entire controlled environment or down to one cell but also vertically for one level or multi level upward.

The mixed media farm 10 depicted in FIG. 1 may be an indoor system having one or a multi-leveled shelving unit 12 for growing plants in several trays 14. The farming activity shown in FIG. 1 includes several stages of plant growth, including seeds planted in or on top of the soil, while other plants have sprouted, but are not yet fully mature, while others are more mature and are near full growth and may soon be ready for harvest. The shelving unit 12 may include several levels of shelves 13, which are vertically separated from each other by a distance, "D," and supported by support members 15. The distance D by which adjacent shelves 13 are spaced may be large enough to allow the plants to grow. The distance D may vary from a couple inches (e.g., 4-6 inches) for trays 14 containing small crops or freshly planted seeds, to several feet (e.g., 6-8 feet) for trays including large crops. The mixed media farm 10 depicted in FIG. 1 includes five levels of plant growing activity. The number of shelves 13 included in the shelving unit 12 and used for plant growing activity may be varied based on the demand of farmed crops. In this regard, shelves 13 may be added to be greater than 5 shelves or removed on an as-needed basis. Furthermore, additional shelving units 12 may be added or removed on an as-needed basis. The shelving unit 12 may additionally include utility conduits 17, which may include irrigation lines for supplying water, or electrical lines for supplying electricity, as will be described in more detail below. In FIG. 1, utility conduit 17 is shown routing to the middle tray but the utility conduit 17 may be routed to the left and right trays. It is not shown in FIG. 1 for the purposes of clarity.

Figure 2:
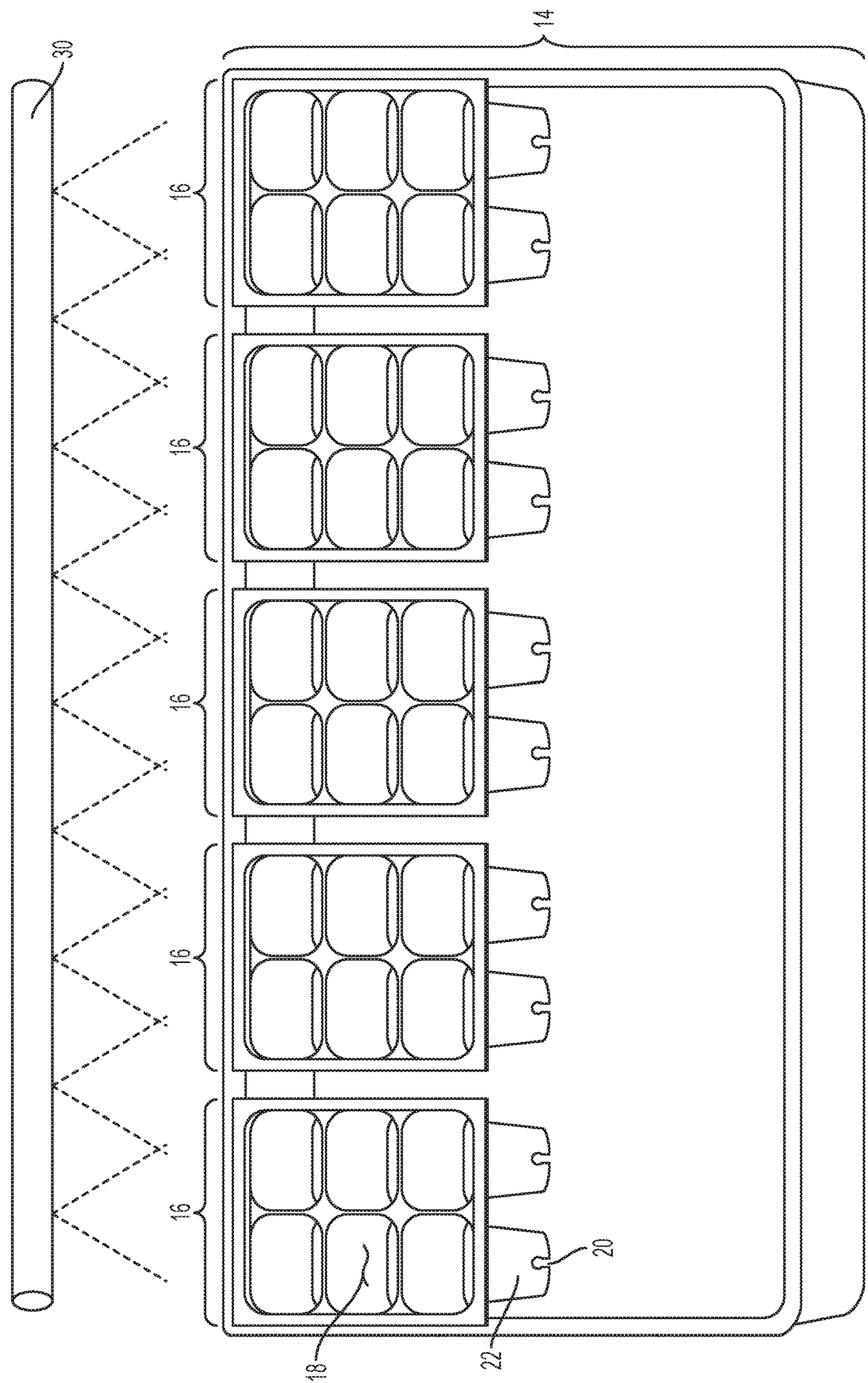
FIG. 2 is an upper perspective view of a tray and a plurality of cells located in the tray.

FIG. 2 is an upper perspective view of a tray 14 and several empty cells 16 placed in the tray 14, along with a light source 30 positioned above the tray 14 and cells 16. The exemplary tray 14 is large enough to hold approximately ten cells 16, i.e., two rows and five columns of cells 16. Each cell 16 may include several cavities 18 within which soil and seeds may be planted. Each cell 16 may have one or more membranes or openings 20 formed in a cell wall 22 to allow water to pass through the cell wall 22 and reach soil located in the cell cavity 18. The exemplary cells 16 each include six cavities 18 having an upper opening of approximately 2"×2" and a depth of approximately 3". It is understood that the size and configuration of the tray 14 and cell 16 is not limited to that which is shown in FIG. 2. Rather, the tray 14 and cell 16 may be any shape, e.g., oval, circular, square, triangular, and any size. Likewise, the cell 16 may be any shape and size, so long as it can fit inside of the tray 14. Moreover, the cells 16 may be sized and structured to maximize the number of cell cavities 18, and the corresponding planting area, that can be placed in a given tray 14.

The mixed media farm 10 may be used to grow herbs, such as basil, thyme, mint, etc., vegetables, flowers, thyme, thai basil, sweet basil, lemon mint, spearmint, tomatoes, strawberries, grass, flowers, fruit trees up to 1 foot tall, and many more indoor plants such as ferns, lemon trees, etc.

To build the mixed media farm 10, soil 24 (see FIGS. 3 and 3A) may be aerated and then placed in the cell cavities 18. Soil 24 may be purchased in a bag (by way of example and not limitation, MIRACLE-GRO ALL PURPOSE GARDEN SOIL or POTTING MIX or other soil or potting mix), and thus, aeration of the soil 24 may include opening the bag and churning the soil 24 by hand, using a motion similar to a person tossing a salad. Although a manual hand process is explained, it is also contemplated that aeration may occur through mechanical agitation (e.g., mixer, mixing machine, robotic arm). Aeration of the soil 24 loosens the soil to allow air into the soil 24. Aeration may also be performed with the use of a tool, such as a hand rake or other tools known in the art. The soil may be aerated until to the following level. For example, if a cell could hold X grams (e.g., 200 grams) of soil, post aeration, the cell would hold only about X/2 grams (e.g., 100 grams) of soil. Aeration of the soil 24 may promote the formation of desirable bacteria (i.e., aerobic bacteria) within the soil 24. After aeration is complete, a sufficient amount of soil 24 may be placed in the cell cavities 18 to allow the intended plant to grow. As such, the cell cavities 18 may be completely filled with soil 24 or only partially filled with soil 24. Although the foregoing describes aerating the soil 24 prior to placement of the soil 24 into the cell cavities 18, it is contemplated that the soil 24 may be aerated after the soil 24 is placed in the cell cavities 18. The soil may also be treated for insect eggs using steam or heat (autoclave) to ensure environmental contamination is minimized. It is also contemplated that the water which is introduced into the trays may be aerated as well such as by bubbling air into the water either before the water is fed into the tray or bubbling air into the water in the tray.

Several seeds 26 may be planted in or on the top surface of the soil 24 near the top of the soil 24, i.e., near the top surface of the soil 24, but preferably on the top surface. The seeds 26 may be planted relative to each other so as to define a seed density, which refers to the number of seeds 26 in a given two-dimensional footprint, which may be generally parallel to the top surface of the soil 24 or generally horizontal. The seed density may vary, depending on the type of plant that will be grown and the corresponding root structure and leaf/stem structure. For example, about 5 seeds for basil and 12 seeds for thyme. However, the seed density may be between 1 to 300 seeds per square inch, and is preferably at least 5 seeds per square inch, while in other implementations, may be at least 10 seeds per square inch, at least 15 seeds per square inch, or at least 20 seeds per square inch. For a plant such as basil, a preferred seed density may be between 10-20 seeds per square inch. For very small seeds such as a seed for chives, these seeds is more difficult to separate out by hand. As such, these seeds may be spread about to cover about 20% to 80% of the top surface area of the soil, and more preferably about 40% to 60% of the top surface area of the soil.

The cells 16 may be placed in the tray 14, which may serve as the structure for retaining water. As such, the cells 16 may be placed in the tray 14, and then a sufficient amount of water may be placed in the tray 14. Alternatively, water may be placed in the tray 14 prior to placing the cells 16 in the tray 14. The amount of water in the tray 14 may be such that approximately 50% of the soil 24 resides below a water line 28, while the remaining portion of the soil 24 resides above the water line 28. The amount of soil 24 residing below the water line 28 may range from 10%-80%, without departing from the spirit and scope of the present disclosure. In this respect, the lower portion of the cells 16 may be submerged in the water, while the upper portion of the cells 16 may extend above the water. At least a portion of the soil may have a consistency of wet mud. In view of the upper portion of the soil 24 not being 100% saturated with water, aerobic bacteria (e.g., good bacteria) may grow in the upper portion of the soil 24.

Light for the mixed media farm 10 may be provided by electrically powered light sources 30 (see FIG. 2). Low wattage, spread spectrum LED bulbs (e.g., white LED bulbs) may be used as the light sources 30. Such LED light bulbs may function similar to residential or office space lighting. The light bulbs may be safely operated, due to their low wattage, and familiarity by operators of the mixed media farm 10. The wattage may be sufficient to provide the necessary light to the leaves on the plants to allow for plant growth, without penetrating through the surface of the soil 24. Accordingly, the wattage may allow good bacteria to grown in the soil 24, while minimizing the growth of algae. Low wattage, spread spectrum LED bulbs which may be used in the mixed media farm 10 may require significantly less energy than bulbs used in previous indoor farms. For instance, typical indoor vertical farms use 60-100 W light bulbs, whereas the mixed media farm 10 may use light bulbs that are below 34 W light bulbs and may be as low as 10 W. As such, the operational costs of the mixed media farm 10 may be less than existing indoor vertical farming operations.

The light source(s) 30 may be on continuously to provide light to the plants. Alternatively, if there are portions of the plant growing cycle which may not require light, such as after the seeds 26 have been planted, but before germination, the light source(s) 30. Limiting the duration which light is directed toward the plant to only the minimal amount of time needed for plant growth may minimize electricity costs, while also mitigating algae growth on the soil 24.

The amount of light directed toward the plants may also vary depending on the size of the plants, and the thickness of the associated leaves. For instance, plants having thicker leaves may require or allow for a high light wattage, while plants having thinner leaves may require or allow for lower light wattage. Therefore, the farming operations may include identifying the leaf characteristics of the plant that is to be grown and adjusting the strength of the light source 30 based on the determined leaf characteristics.

Figure 3:
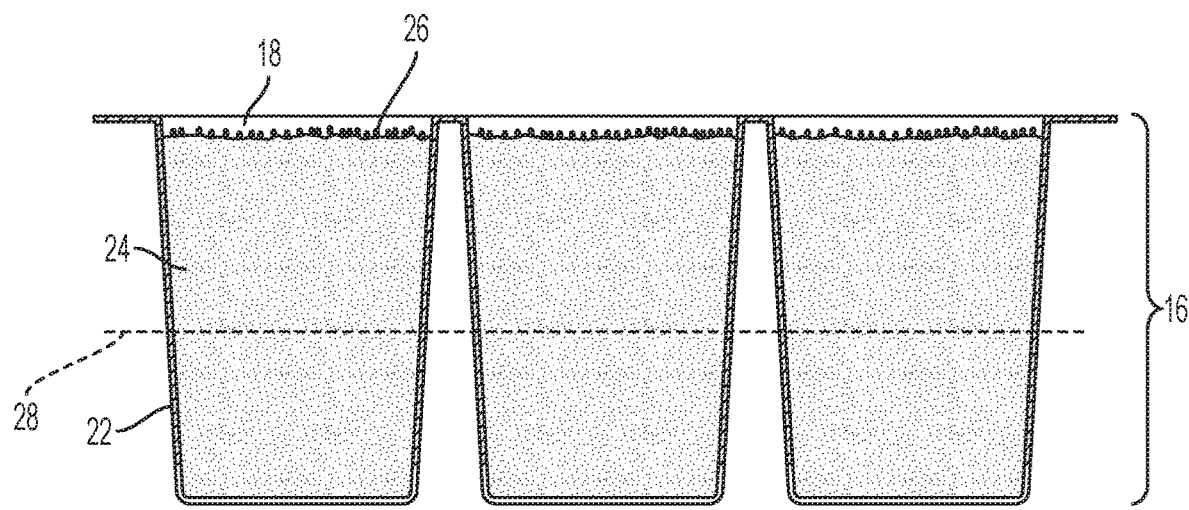
FIG. 3 is a side view of a cell having a plurality of seeds planted on a top surface of the soil.
Figure 3A:
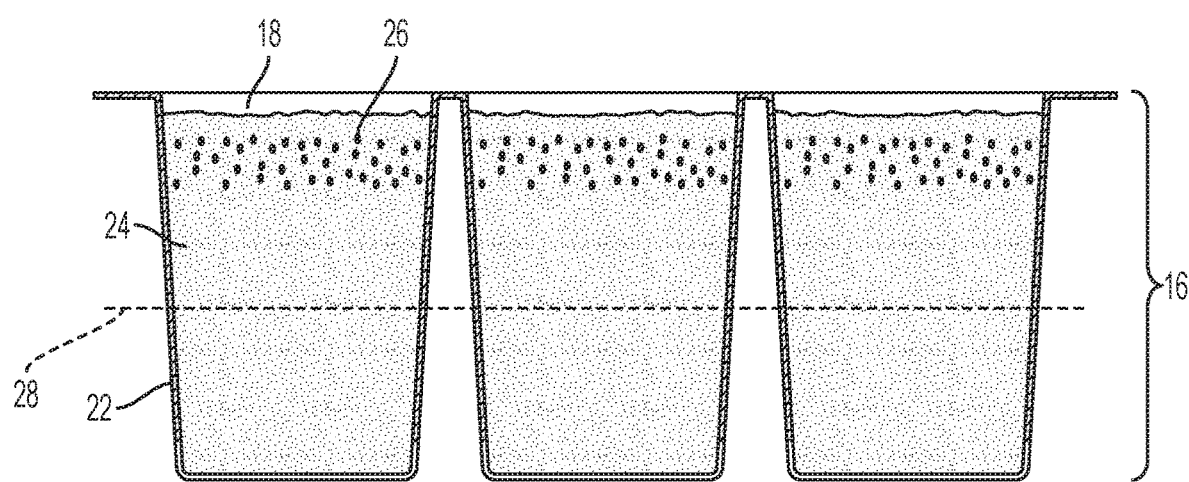
FIG. 3A is a side view of a cell having a plurality of seeds planted therein.
Figure 4:
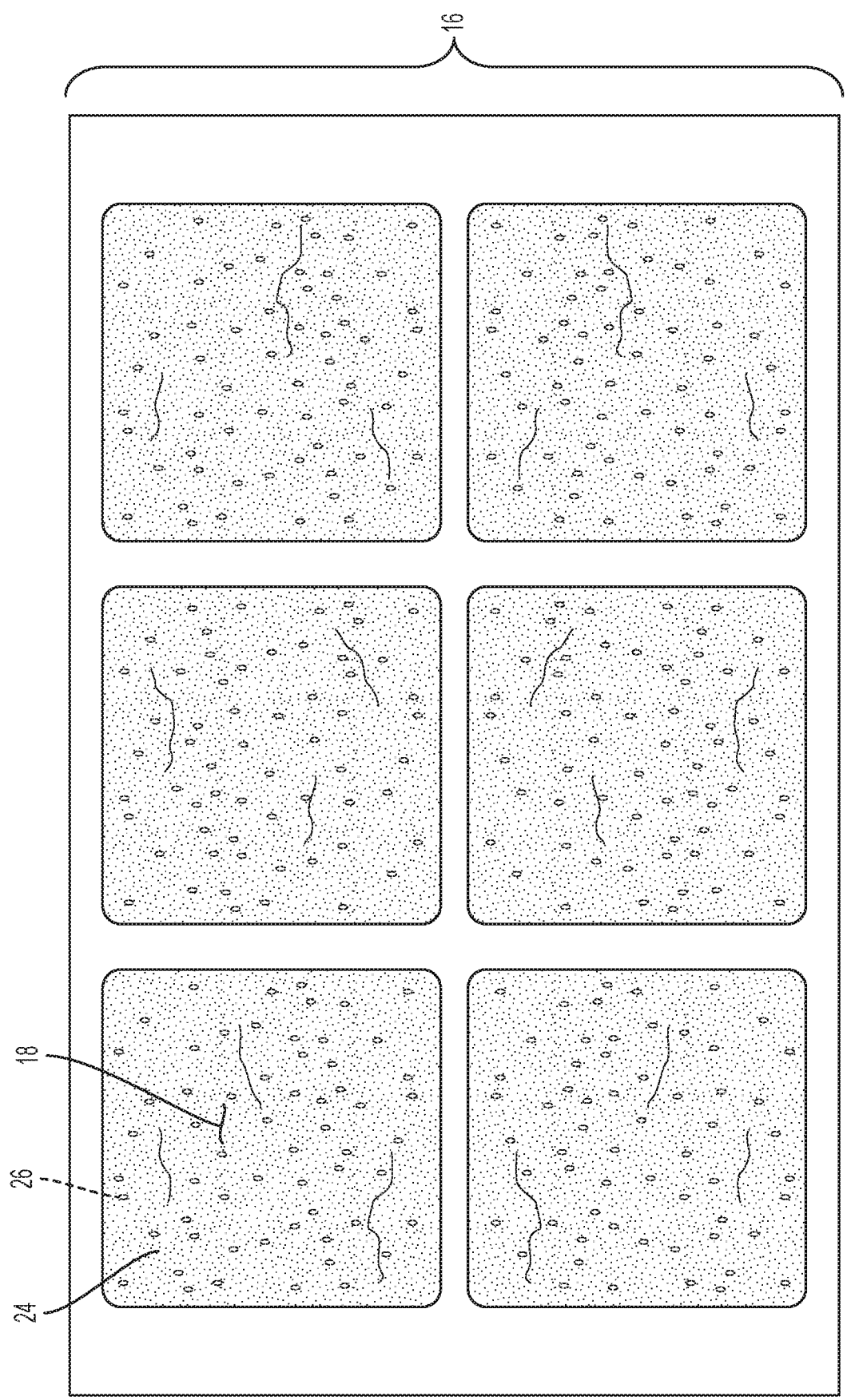
FIG. 4 is a top view of the cell depicted in FIG. 3.

FIGS. 3-8 depict an exemplary sequence of plants growing from a seed 26 to a more mature state with stems and leaves. FIGS. 3-8 only depict a single cell 16 without the corresponding tray 14. In FIGS. 3 and 4, the cell 16 is shown, with soil 24 and a plurality of seeds 26 in the cell cavities 18. The seeds 26 are located in the upper half of the respective cell cavity 18, above the water line 28. A lower portion of the soil 24 resides below the water line 28, with the water being able to pass through the cell wall 22 via the opening 20 (see FIG. 2) formed in the cell wall 22. The water is able to saturate the lower portion of the soil 24 to 100% saturation, while the upper portion of the soil 24 may be less than 100% saturation. The water wicks up from the bottom portion of the soil 24 to the top portion of the soil 24, and thus, the top half of the soil 24 is wet with air, as a result aeration. It is recognized that soil 24 may have both preferred, and nonpreferred fungus and bacteria. When soil 24 is saturated to 100%, aerobic bacteria (e.g., preferred bacteria) may die. Therefore, by only submerging part of the soil 24, aerobic bacteria is allowed to grow within the soil 24. The aerobic bacteria mitigates undesirable fungus, and thus, the existence of aerobic bacteria in the soil 24 may control fungal growth. With regard to undesirable anaerobic bacteria, the existence of air within the soil 24 may prohibit or mitigate the growth of such anaerobic bacteria. Reducing or mitigating the growth of anaerobic bacteria and fungi may be important because anaerobic bacteria and fungus may create root rot or other root related disease and kill the plant and create root related diseases.

Figure 5:
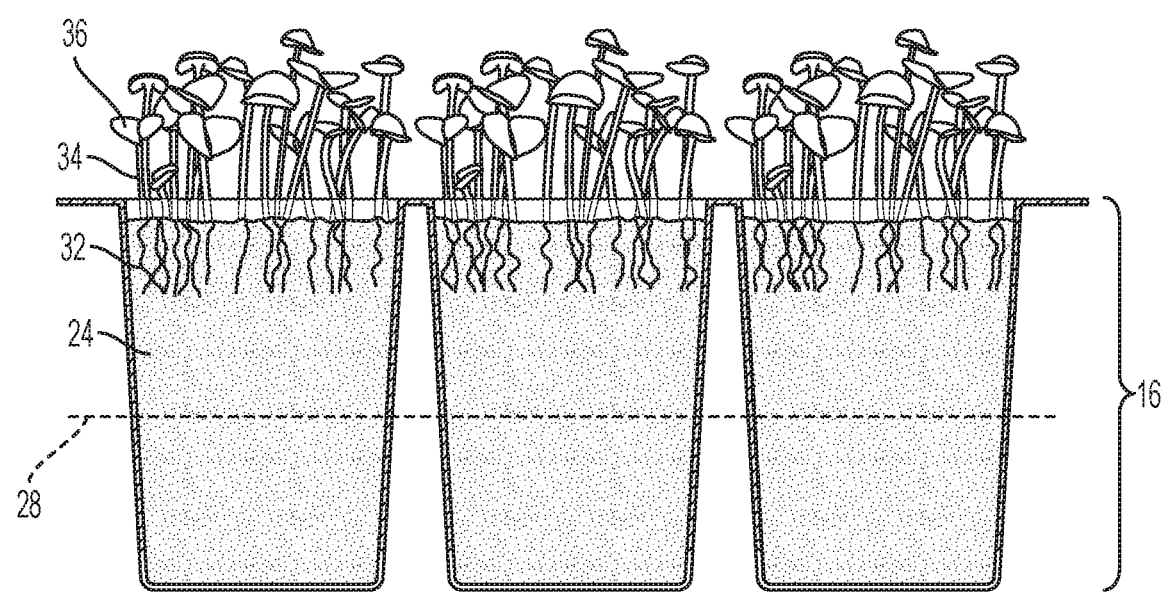
FIG. 5 is a side view of the cell after the plurality of seeds have germinated to grow stems and leaves.
Figure 6:
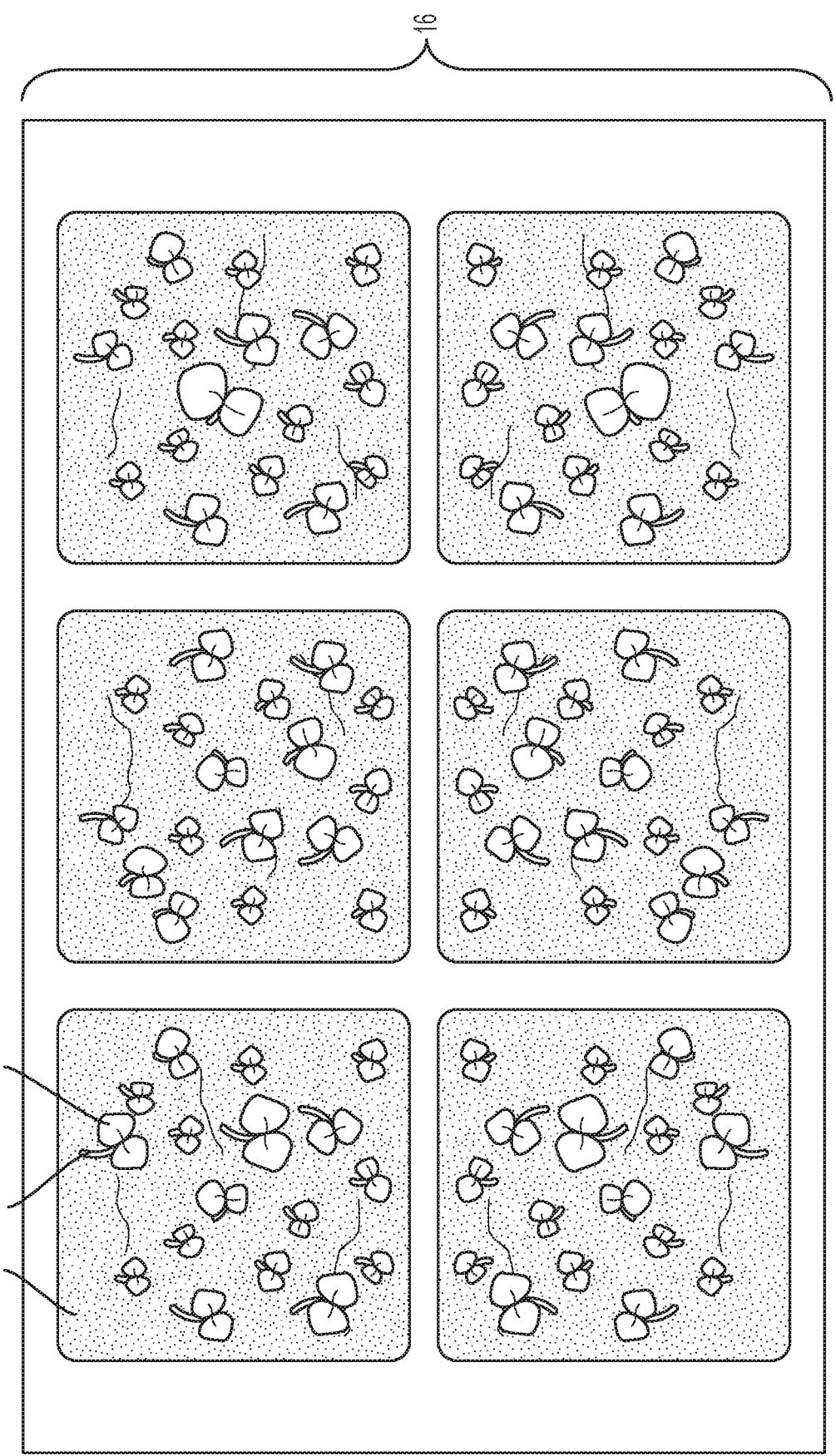
FIG. 6 is a top view of the cell depicted in FIG. 5.

In FIGS. 5 and 6, the seeds 26 have germinated, and formed roots 32 that extend downwardly into the soil 24, and stems 34 that extend out of the soil 24, along with small leaves 36 on the stems 34.

Figure 7:
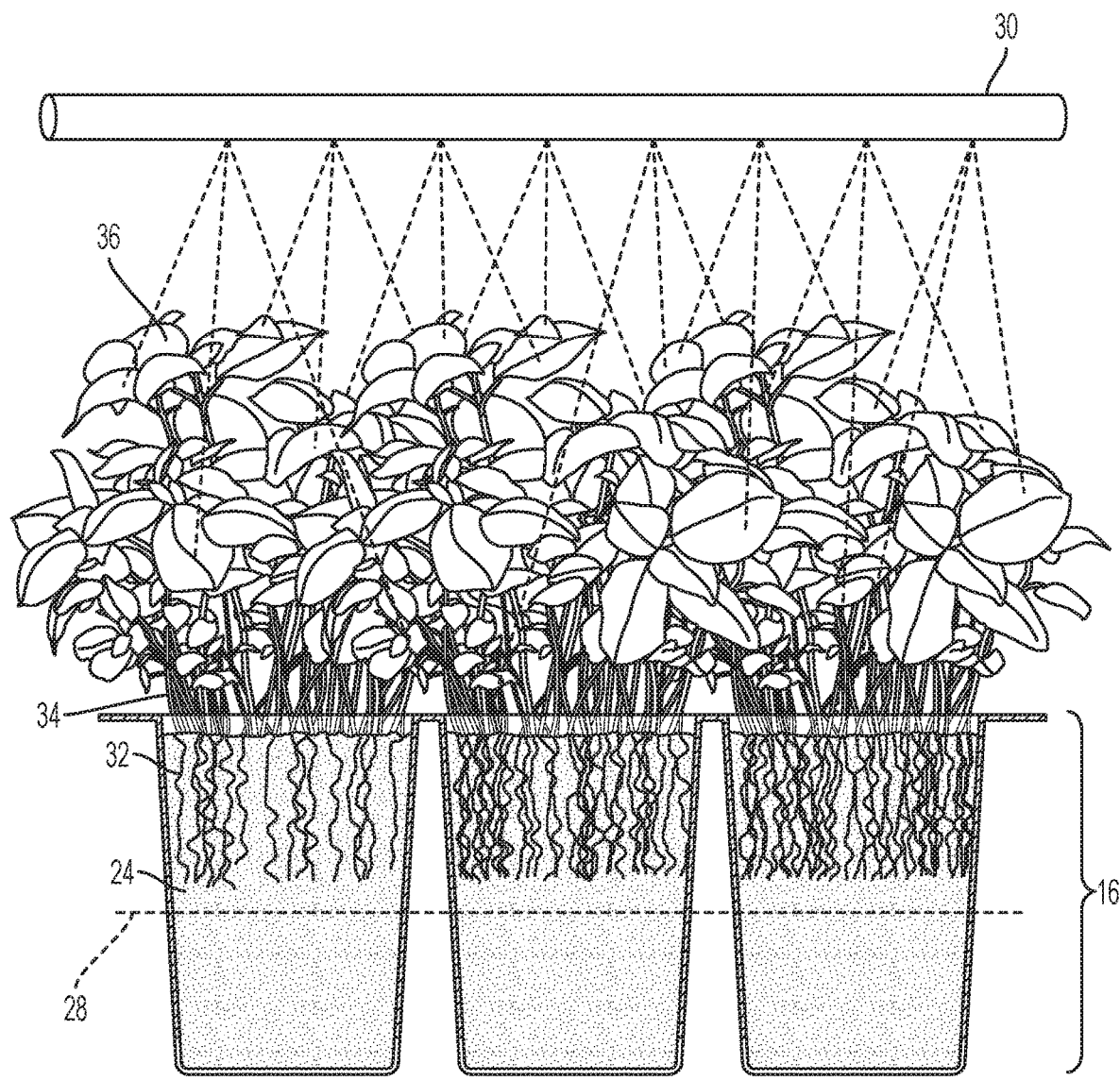
FIG. 7 is a side view of the cell as the plants have matured and grown from that shown in FIG. 5.
Figure 8:
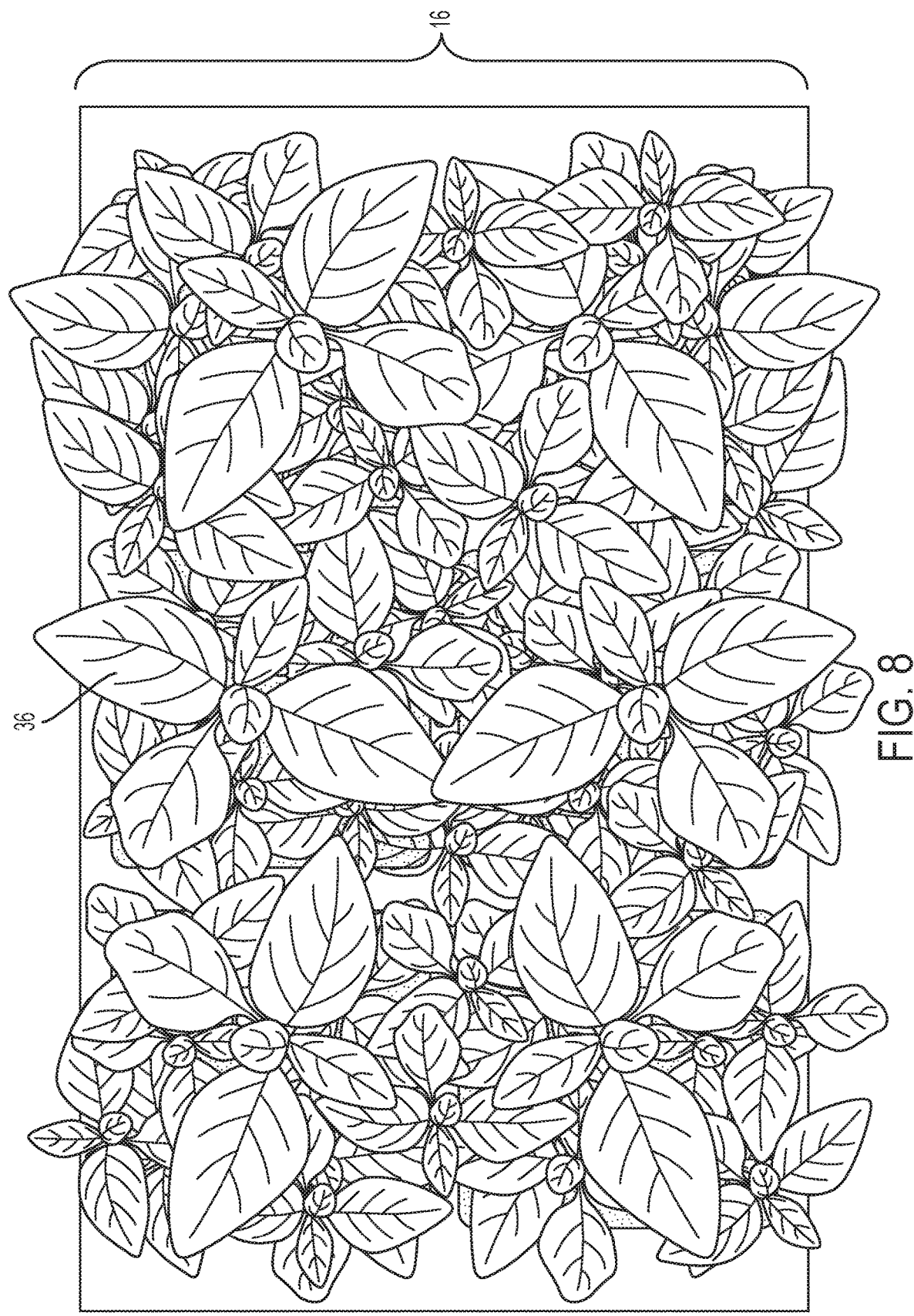
FIG. 8 is a top view of the cell depicted in FIG. 7.
Figure 9:
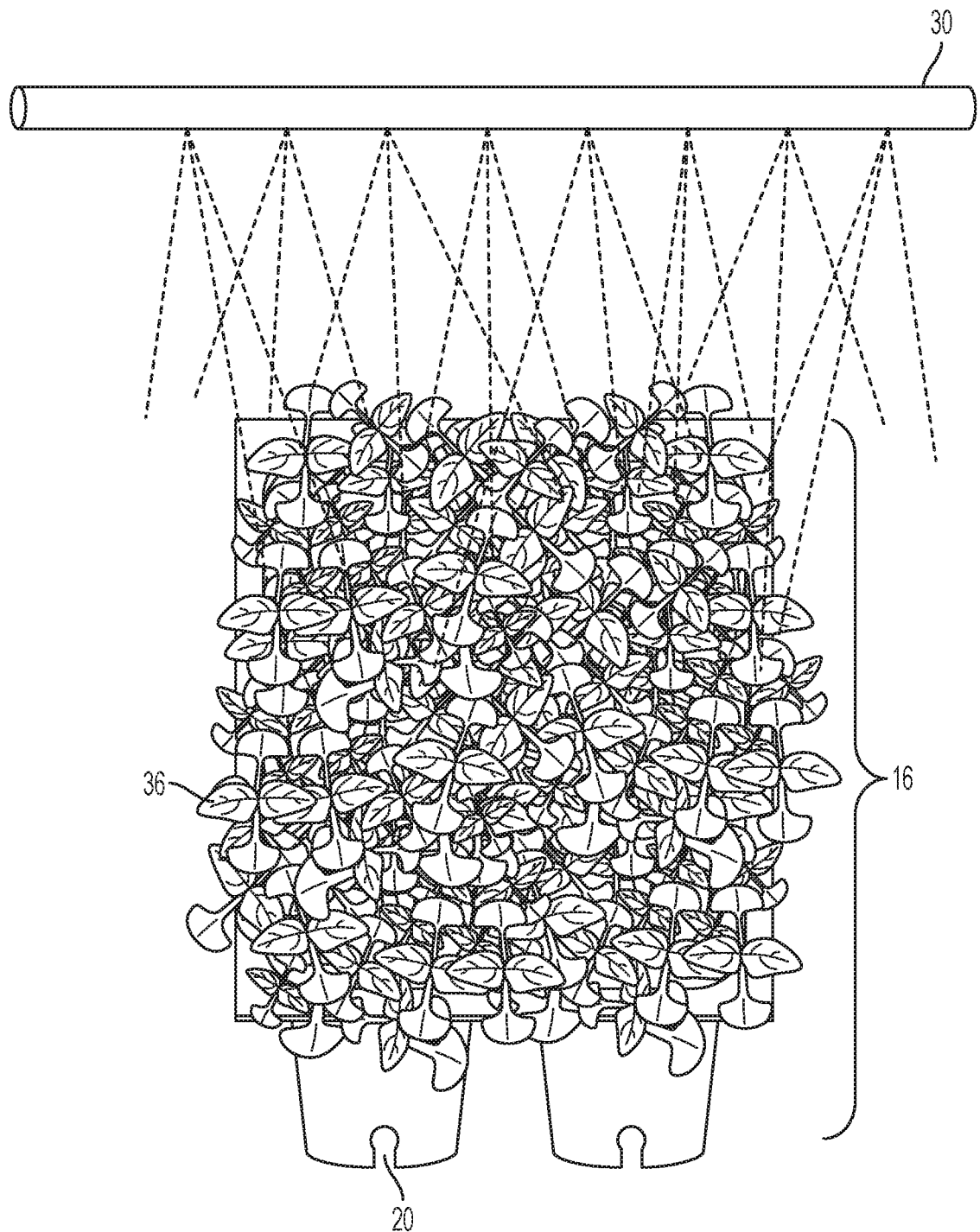
FIG. 9 is an upper perspective view depicting a light source directing light toward plants growing within a cell.

Over time, the plants grow and mature from the stage shown in FIGS. 5 and 6 to the stage shown in FIGS. 7 and 8. The roots 32 may grow, along with the stems 34 and leaves 36. As the plants grow and mature, the plants collectively define a leaf coverage which substantially extends over the surface of the soil 24. As can be seen in FIG. 8, which is a top view of the cell 16 and the plants grown therein, the leaves 36 extend over the soil 24, and thus, the soil 24 is covered from the perspective shown in FIG. 8. Thus, when light is directed from the light source 30 above the plants, the direct light contacts the leaves 36, and may hit the top of the soil 24, but may not penetrate beneath the top surface of the soil 24. FIG. 9 is an upper perspective view depicting substantial leaf coverage over the soil 24 so as to absorb a substantial portion of the light emitted by the light source 30. The leaf coverage may play a role in preventing algae or fungal growth by absorbing much of the light emitted by the light source 30.

Figure 10:
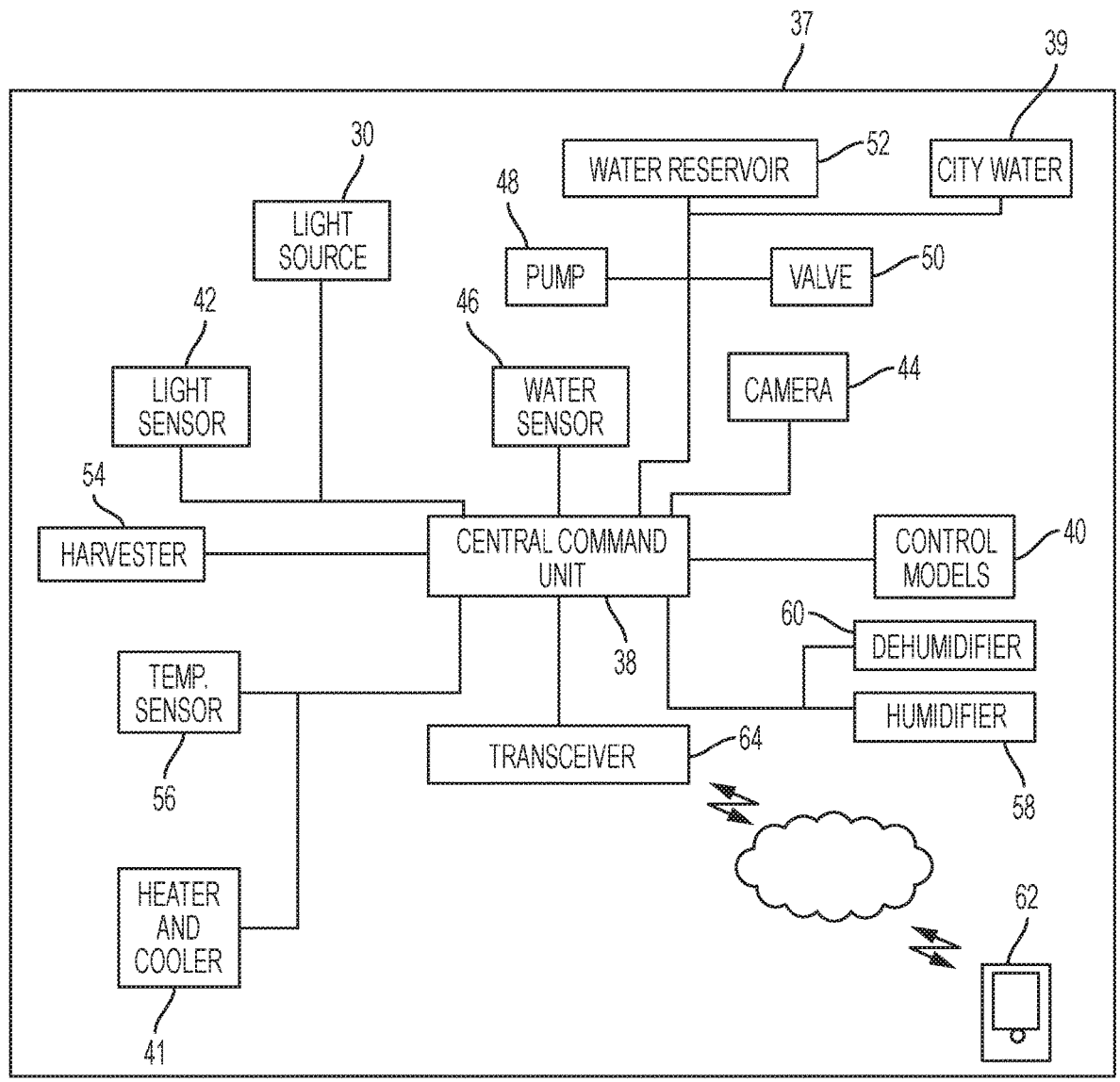
FIG. 10 is a schematic diagram showing electronic components which may be used in the mixed media farm.

One benefit of the mixed media farm 10 may be that the mixed media farm 10 utilizes soil 24 to deliver nutrients, and thus, the mixed media farm 10 may not require the addition of chemicals, as is typically required by hydroponic farming. The use of soil 24 may result in healthier plants, with thicker leaves 36 than hydroponic farms. Another benefit is that the mixed media farm 10 may not require the use of pesticides for farming due to the mixed media farm 10 being grown in a controlled environment (e.g., indoor or inside). The controlled environment in which the mixed media farm 10 grows may be fully controlled and treated like a cleanroom environment. As shown in FIG. 10, the mixed media 10 farm may be disposed in a room 37 which is sealed so that bugs and other insects do not enter the room. Moreover, it is contemplated that individuals tending to the mixed media farm 10 may wear clean coats, special shoes, and wash their hands before entering the space containing the mixed media farm 10. Individuals may also enter a triage space to cleanup before entering the room 10 of the farming operations to promote cleanliness in the farming environment.

The indoor environment of the mixed media farm 10 may allow for control of environmental conditions. For instance, humidity, temperature, lighting, wind speed, and $CO_2$ levels may be controlled in the space to mitigate suboptimal plant conditions. With regard to wind speed, air movement within the space including the mixed media farm 10 may help prevent disease and also prevent too much humidity from resting on the leaf. The moving air mitigates small insects from landing on a leaf and eating away at it. Also air movement facilitates uniform temperature across all areas of the farm both vertically and horizontally. Typically heat rises and moving air helps to ensure that every plant is exposed to air at the same temperature. Additionally, the soil may be treated for insect eggs using steam or heat (autoclave) to ensure environmental contamination is minimized.

As noted above, the building blocks of the mixed media farm 10, specifically, the tray 14 holding the water, and the small planting cells 16 which holds the soil 24 and seeds 26, may allow the mixed media farm 10 to be constructed as an indoor vertical farm. Furthermore, the use of the tray 14 and small planting cells 16 may allow the mixed media farm 10 to grow horizontally (i.e., along X and Y axes), as well as vertically (i.e., along a Z axis).

Referring now to FIG. 10, the mixed media farm 10 may include several electronic components which implement various functions on the mixed media farm 10. The mixed media farm 10 may include a central command unit 38, which may receive information from a variety of sensors and make decisions on how to best control the farming environment. In this regard, the central command unit 38 may receive the information from the sensors (e.g., temperature and humidity sensors), process the information, and generate command signals based on the received information. The command signals may implement functionality for controlling farming operations, as well as the farming environment. The central command unit 38 may allow various functions on the mixed media farm 10 to be performed autonomously, e.g., without user input. For example, water provided in the tray may be provided by city water 39 or a reservoir 52 and the water level in the tray is adjusted by adding more water when needed based on a water level sensor in the tray. This may be done without user or human intervention.

The central command unit 38 may be in communication with a database 40 having command models stored thereon, wherein the command models may govern the processing of data and generation of command signals. It is contemplated that the database 40 may be external to the central command unit 38, or stored locally on the central command unit 38. As more information is captured by the sensors, a library of information may be compiled, which may be used to retrain the models based on the observed characteristics of each plant, e.g., basil thyme, mint, etc.

The mixed media farm 10 may include a light sensor 42, which may monitor the health of the light source 30 and generate an alert signal when the light sensor 42 detects a light bulb going out or losing intensity. When the mixed media farm 10 is a multi-level farm constructed on shelves, the light sensor 42 may be installed behind each shelf. Traditionally, a farmer may not be able to monitor fluctuations in bulb quality, which may result in their plants losing quality. In contrast, the light sensor 42 on the mixed media farm 10 may monitor the emitted light intensity of the light source 30, as well as the number of light bulbs in operation. Should the light intensity or number of operating light bulbs fall below a predetermined threshold, the central command unit 38 may automatically issue a replacement order, generate an alarm signal, or send a communication (e.g., text message or email) to a farm operator.

The mixed media farm 10 may further include one or more cameras 44 or computer vision sensors for monitoring plant growth and health. The cameras 44 may be installed above each shelf and monitor plants. The image information collected by the cameras 44 may be used to look at the plant color to determine if the plant leaves are healthy. The cameras 44 may also be used to monitor plant growth and generate an alert signal when one or more plants are ready for harvest.

The mixed media farm 10 may additionally include water sensors 46 to monitor the water level within the trays. The water sensors 46 may be placed on each tray 14 and send a real-time request for more water when the water level in one or more trays 14 falls below a predetermined threshold. The real-time request may be received by the central command unit 38, which may actuate a pump 48 or open a valve 50 to allow water from a water reservoir 52 to flow into the tray 14 through an irrigation network. The irrigation network may include plumbing or irrigation ducts coupled to the shelves. Each tray 14 may have an irrigation line for refilling the tray 14 with water when needed. In this respect, the process of detecting the water level and refilling the water in the tray 14 on an as-needed basis may be performed autonomously.

When the plants have grown to maturity and are ready for harvest, the mixed media farm 10 may include a harvester 54. A human operator may place a tray 14 having plants ready for harvest into a short tunnel that uses computer vision to detect the location of the plant to cut, and then safely cut the plants. Harvesting may be done either by way of a machine without human intervention or by hand or manually (e.g., with shears). The harvesting may be accomplished by removing the trays from the shelves or with the trays in place on the shelves. When the plant is cut, the harvester 54 may cut the plant sufficiently higher than the soil level and above the second leaf/stem above the root. The harvester 54 may then perform any additional cutting operation which may be associated with that particular plant, and then direct the cleaned tray 14 to the other side of the tunnel for a human operator to place back in a farming aisle. The harvester 54 may use a series of beam break sensors to ensure humans are not near the cutting blades. The sensors included in the harvester may allow several steps in the harvesting operation to proceed autonomously, which promotes safety by minimizing human interaction with the cutting operation, while also increasing efficiency.

Once the plants are harvested, they may be packaged for sale. The packaging used for the plants may include heat seal bags, which may result in longer shelf life than if the plants were packaged in clam shell packaging. However, the use of clam shell packaging is now precluded by the present disclosure, and thus, the plants may also be packaged in such clam shell packaging.

The mixed media farm 10 may include one or more temperature sensors 56 for monitoring temperature of the space within which the mixed media farm 10 is located. The central command unit 38 may have preset temperature parameters stored thereon for various plants that may be grown at the mixed media farm 10. The central command unit 38 may be in communication with one or more HVAC units, fans, or other temperature control hardware (e.g., heater and cooler 41) for assisting in controlling the temperature within the mixed media farm 10. It may be desirable to keep the temperature of the mixed media farm 10 at a minimum of 70-75 degrees Fahrenheit, which may be a suitable temperature for growing the plants without fostering algae growth. It is also contemplated that the minimum temperature may be below 68, Fahrenheit such as 60 degrees Fahrenheit, 50 degrees Fahrenheit, or lower. Furthermore, it may be desirable to keep the temperature below a maximum of 70 degrees Fahrenheit, or in other instances, 80 degrees Fahrenheit, or perhaps even 90 degrees Fahrenheit.

One or more humidity sensors 58 may be included in the mixed media farm 10. It may be important to keep humidity low, and thus the humidity sensors 58 may monitor the humidity and send humidity information to the central command unit 38, which may be in communication with one or more dehumidifiers 60. Given the structure of the mixed media farm 10, specifically having trays 14 filled with water, it is likely that there will be humidity in the air, and thus, chances that additional humidity will be needed may be low. In this respect, high humidity, high temperature, high wind speeds, or lack of air movement may create optimal conditions for unhealthy algae or fungus growth. As such, it may be desirable to maintain humidity at less than 50%.

The mixed media farm 10 may include a mobile application or browser application to provide a user interface to farm team members. The central command unit 38 may push content from the central command unit 38 to the mobile application or browser application to allow the farm team members to see several aspects of the farming operations on a computer or handheld device, such as a smartphone 62. For instance, the team may see areas of the farm requiring maintenance, areas of the farm ready for harvesting, or areas of the farm which may require seeding. The mixed media farm 10 may include a transceiver 64 in communication with the central command unit 38 to facilitate communication with the smartphone 62 or other remote devices through long range communications.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A mixed media farming method comprising the steps of:
    planting a plurality of seeds in soil located in an upper portion of a cell, the plurality of seeds being arranged within the upper portion of the cell such that the plurality of seeds define a seed density of at least 5 seeds per square inch;
    submerging only a lower portion of the cell in water such that the lower portion of the cell is submerged under the water and an upper portion of the cell extends above the water, the cell having at least one opening submerged in the water to allow a lower portion of the soil to become saturated by the water;
    directing light emitted from an electronic light source toward the soil; and
    allowing the plurality of seeds to sprout and grow leaves which substantially cover the soil to substantially block light emitted from the electronic light source from penetrating through on the soil for mitigating algae growth.

2. The method recited in claim 1, further comprising the step of aerating the soil to mitigate anaerobic bacteria growth and facilitate growth of aerobic bacteria.

3. The method recited in claim 1, wherein the step of partially submerging the cell in water includes at least partially filling a tray with water, and then placing the cell in tray.

4. The method recited in claim 1, wherein the step of partially submerging the cell in water includes placing the cell in a tray and then at least partially filling the tray with water.

5. The method recited in claim 1, wherein planting step includes planting the seeds in the soil such that the seed density is at least 10 seeds per square inch.

6. The method recited in claim 1, wherein planting step includes planting the seeds in the soil such that the seed density is at least 15 seeds per square inch.

7. The method recited in claim 1, wherein planting step includes planting the seeds in the soil such that the seed density is at least 20 seeds per square inch.

8. The method recited in claim 1, further comprising a tray wherein the tray is placed in a room, and the method further comprising a the step of controlling a humidity of air inside of the room.

9. The method recited in claim 8, wherein the controlling step includes maintaining the humidity of air inside of the room below 60 percent humidity.

10. The method recited in claim 8, wherein the controlling step includes maintaining the humidity of air inside of the room below 50 percent humidity.

11. The method recited in claim 8, wherein the controlling step includes maintaining the temperature of the room between 60-80 degrees.

12. The method recited in claim 8, wherein the controlling step includes maintaining the temperature of the room between 70-75 degrees.

13. The method recited in claim 1, further comprising a tray wherein the tray is placed in a room, and the method further comprising the step of controlling a the temperature of air inside the room.

14. A mixed media farming method comprising the steps of:
submerging only a lower portion of a cell in water such that only the lower portion of the cell is submerged under the water and an upper portion of the cell extends above the water, the cell having at least one opening submerged in the water to allow a soil in the lower portion of the cell to become saturated by the water, the cell further including a plurality of seeds planted in the soil located only in the upper portion of the cell, the plurality of seeds being arranged within the upper portion of the cell such that the plurality of seeds define a seed density of at least 5 seeds per square inch;
directing light emitted from an electronic light source toward the soil; and
allowing the plurality of seeds to sprout and grow leaves which substantially cover the soil to substantially block light emitted from the electronic light source from penetrating through the soil for mitigating algae growth.

15. The method recited in claim 14, further comprising the step of aerating the soil to mitigate anaerobic bacteria growth and facilitate growth of aerobic bacteria.

16. A farm comprising:
water;
a tray for holding the water and an upper surface of the water in the tray defining a prescribed water level;
a cell defining a cavity and having at least one opening in communication with the cavity, the cell being placable on the tray with a bottom surface of the cell contacting an upper surface of a bottom wall of the tray, the cell being sized such that when the cell is placed on the tray a lower portion of the cell resides below the water level to saturate the lower portion the cell and an upper portion of the cell resides above the water level having less than 100% saturation of water;
soil in the cavity, the soil having a lower portion below the water level, and an upper portion above the water level when the cell is placed in the tray; and
a plurality of seeds planted in the upper portion of the soil, the plurality of seeds defining a seed density of greater than 5 seeds per square inch.

17. The farm recited in claim 16, further comprising an electronic light device configured to emit light toward the soil.

18. The farm recited in claim 16, wherein the plurality of seeds define a seed density of at least 10 seeds per square inch.

19. The farm recited in claim 16, wherein the plurality of seeds define a seed density of at least 20 seeds per square inch.

20. The farm recited in claim 16, further comprising a water reservoir and a supply line in communication with the water reservoir and the tray for communicating water from the water reservoir to the tray.

* * * * *